US007992087B1

(12) United States Patent
Cameron

(10) Patent No.: US 7,992,087 B1

(45) Date of Patent: Aug. 2, 2011

(54) DOCUMENT MAPPED-OBJECT PLACEMENT UPON BACKGROUND CHANGE

(75) Inventor: Stefan Cameron, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 745 days.

(21) Appl. No.: 12/038,769

(22) Filed: Feb. 27, 2008

(51) Int. Cl.
*G06F 17/00* (2006.01)
*G06F 3/48* (2006.01)
*G06F 3/14* (2006.01)

(52) U.S. Cl. ........ 715/716; 715/717; 715/718; 715/719; 715/778; 715/773; 715/825

(58) Field of Classification Search .......... 715/200–277, 715/700–867; 700/701–866; 705/50–79; 709/201–229; 345/30–111, 420, 611; 348/206–231.9; 382/173, 176, 195
See application file for complete search history.

(56) References Cited

U.S. PATENT DOCUMENTS

| | | | | |
|---|---|---|---|---|
| 6,031,544 | A | 2/2000 | Yhann | |
| 6,639,593 | B1 | 10/2003 | Yhann | |
| 6,701,012 | B1 * | 3/2004 | Matthews | 382/173 |
| 6,859,911 | B1 | 2/2005 | Herasimchuk | |
| 6,941,014 | B2 * | 9/2005 | Lin et al. | 382/176 |
| 7,113,185 | B2 * | 9/2006 | Jojic et al. | 345/420 |
| 7,139,970 | B2 | 11/2006 | Michaud et al. | |
| 7,324,120 | B2 * | 1/2008 | Curry et al. | 345/611 |
| 7,397,952 | B2 * | 7/2008 | Malvar et al. | 382/195 |
| 7,844,118 | B1 * | 11/2010 | Li et al. | 382/195 |
| 2004/0049740 | A1 | 3/2004 | Petersen | |
| 2010/0141651 | A1 * | 6/2010 | Tan | 345/420 |

OTHER PUBLICATIONS

"About the Creat New Forms Wizard", [Online]. Retrieved from the Internet: <URL: http://help.adobe.com/en_US/Acrobat/8.0/Professional/help.html?content=WSA8344E32-407B-4460-A70B-ADD14A163D17.html>, 1 pg.
"Creating New Forms", [Online]. Retrieved from the Internet: <URL: http://help.adobe.com/en_US/Acrobat/8.0/Professional/help.html?content=WS58a04a822e3e50102bd615109794195ff-7e12.html>, 1 pg.
Young, Carl, "Using Form-Field Recognition in Adobe Acrobat 8 Professional", [Online]. Retrieved from the Internet: <URL:http://www.acrobatusers.com/tutorials/2007/form_field_recognition/?printer_friendly=true>, 4 pgs.

* cited by examiner

*Primary Examiner* — Ruay L Ho
(74) *Attorney, Agent, or Firm* — Schwegman, Lundberg & Woessner, P.A.

(57) ABSTRACT

Various embodiments illustrated and described herein provide one or more of systems, methods, and software operable to process multilayered documents including form fields. Some embodiments, are operable to process a new or modified background layer image to identify input fields, to match the identified fields with metadata in foreground layer data defining interactive input fields, and to modify the mappings of the input fields defined within the foreground layer of a page description language document as a function of identified input fields in the modified background layer image.

15 Claims, 6 Drawing Sheets

DOCUMENT MAPPED-OBJECT PLACEMENT UPON BACKGROUND CHANGE

BACKGROUND INFORMATION

It has become increasingly common to create, transmit, and display documents in electronic format. Electronic documents have a number of advantages over paper documents including their ease of transmission, their compact storage, and their ability to be edited and/or electronically manipulated. A page in an electronic document can include various types of graphical elements, including text, line art, and images. Electronic documents are generally created by computer programs (also called application programs or simply applications) that can be executed by a user on a computer to create and edit electronic documents and to produce (directly or indirectly) printed output defined by the documents. Such programs include the ADOBE ILLUSTRATOR® and PHOTOSHOP® products, both available from ADOBE SYSTEMS INCORPORATED of San Jose, Calif. Computer programs typically maintain electronic documents as document files that can be saved on a computer hard drive or a portable medium such as a USB drive or floppy diskette. An electronic document does not necessarily correspond to a document file. An electronic document can be stored in a portion of a document file that holds other documents, in a single document file dedicated to the electronic document in question, or in multiple coordinated document files. Graphical elements in electronic documents can be represented in vector form, raster form, or in hybrid forms.

An electronic document is provided by an author, distributor, or publisher (referred to as "publisher" herein) who often desires that the document be viewed with a particular appearance, such as the appearance with which it was created. A portable electronic document can be viewed and manipulated on a variety of different platforms and can be presented in a predetermined format where the appearance of the document as viewed by a reader is as it was intended by the publisher.

One such predetermined format is the Portable Document Format ("PDF") developed by ADOBE SYSTEMS INCORPORATED. The class of such predetermined formats is often referred to as a page description language. An example of page-based software for creating, reading, and displaying PDF documents is the ADOBE ACROBAT® program, also of ADOBE SYSTEMS INCORPORATED. The ADOBE ACROBAT® program is based on ADOBE SYSTEMS INCORPORATED's POSTSCRIPT® technology, which describes formatted pages of a document in a device-independent fashion. An ADOBE ACROBAT® program on one platform can create, display, edit, print, annotate, etc. a PDF document produced by another ADOBE ACROBAT® program running on a different platform, regardless of the type of computer platform used. A document in a certain format or language, such as a word processing document, can be translated into a PDF document using the ADOBE ACROBAT® program. A PDF document can be quickly displayed on any computer platform having the appearance intended by the publisher, allowing the publisher to control the final appearance of the document. Another predetermined format is the XML Paper Specification page description language developed by Microsoft Corporation of Redmond, Wash. Tools that may be used to generate documents encoded according to one or more of these predetermined formats include word processing programs, printing adapters or drivers, spreadsheet programs, other document authoring programs, and many other programs, utilities, and tools.

Electronic documents can include one or more interactive digital input fields (referred to interchangeably as "input fields" and "form fields" herein) for receiving information from a user. An input field (including any information provided by a user) can be associated with a document file of an electronic document either directly or indirectly. Different types of input fields include form fields, sketch fields, text fields, and the like. Form fields are typically associated with electronic documents that seek information from a user. Form fields provide locations at which a user can enter information onto an electronic document. A text form field allows a user to enter text (e.g., by typing on a keyboard). Other types of form fields include buttons, check boxes, combo boxes, list boxes, radio buttons, and signature fields. Sketch fields are typically associated with electronic documents that contain graphical illustrations and/or artwork. Sketch fields provide locations at which a user can add graphical illustrations and/or artwork to an electronic document, such as by manipulating a pointing tool such as a mouse or digitizing pen. Generally, text fields can be associated with any electronic document. Text fields are locations at which a user can add text to an electronic document.

DETAILED DESCRIPTION

Figure 1:
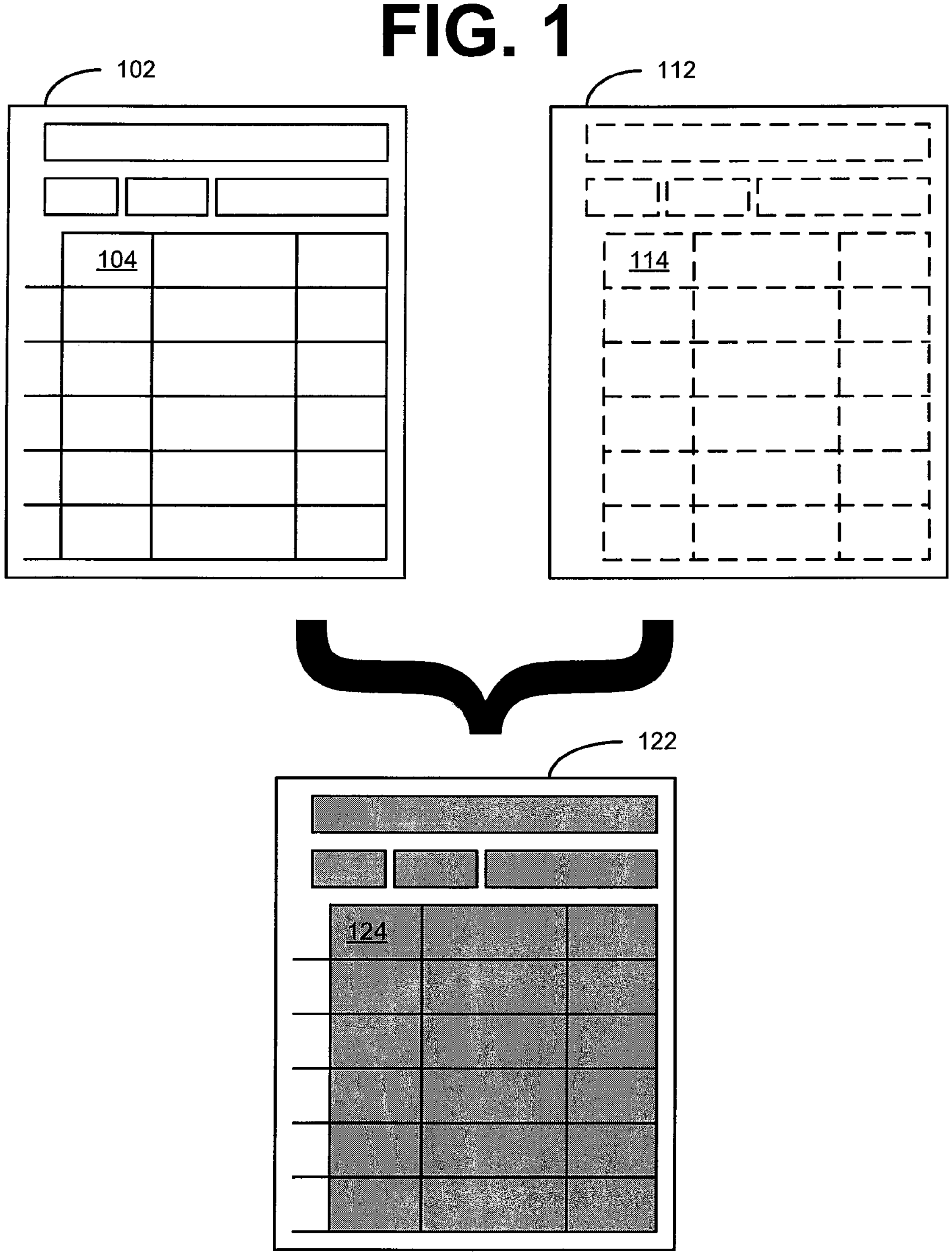
FIG. 1 illustrates layers of a multilayered document according to an example embodiment.

Page description language documents may be created as interactive forms to allow users to input data into a document and store that data with the page description language file and/or submit the input data over a network to a form data repository. Such documents may be defined within a page description language file, such as a PDF file, in multiple layers. In other instances, such documents may be defined within a markup language document, such as a hypertext markup language ("HTML") document, which may also be referred to as a page, using the <area> node mark up to identify an area within such a document or on an image or other element within the document as a hyperlink "hot spot."

In some multilayered documents, a background layer includes an image of a form. The image may be represented in a vector form, raster form, or in hybrid forms. A second, foreground layer is overlaid upon the background layer. The second layer includes defined input fields that are individually mapped to locations upon which the respective input fields are to be located. Each field may include metadata defining properties of the field. Some of these properties impart functionality upon the input field when displayed within an appropriate publishing or viewing application, such as one of the programs within the ADOBE ACROBAT® program family. Such functionality may be imparted based on one of several types of input fields, such as text, sketch, image, dropdown list box, radio button, and the like. As mentioned above, such fields are referred to interchangeably as "input fields" and "form fields" herein.

A publisher or user can generate an input field in a document, such as a form field for a PDF document using an ADOBE ACROBAT® form tool. An input field may be generated by defining an area of the input field, naming the input field, and specifying its type (e.g., form field, sketch field, text field, image, and the like). The area of the input field is typically defined by selecting a location in the electronic document and specifying a shape or size of the input field—e.g., by using a pointing device to draw a shape representing an input field of the required size.

Input fields may also be generated with software programs that automatically detect the presence of one or more possible input field locations in an electronic document. Typically, once a possible field location is detected, the software program generates an input field automatically at the location without the aid of a publisher. These automatically detected input fields may then be presented to a publisher to allow actions such as naming, typing, and other modifications of the input fields.

The mappings of the input fields to locations on the background image may be static. Once they are mapped, the mappings remain the same until a time when the mapping might be altered by a publisher. However, if the background layer image is modified so as to adjust the positions of where the fields in the second, foreground layer should be located, the page description language file must be opened in an editable, publishing mode and the input fields must be manually adjusted. This can be a time consuming and laborious process. The magnitude of such a project can be magnified in many situations, such as when the background layer image is modified due to a corporate branding strategy that introduces a new logo or other graphical item that needs to be included on each of many forms of the corporation. In such instances, the second, foreground layer mappings of each object may be affected.

Various embodiments illustrated and described herein provide one or more of systems, methods, and software operable to process a new or modified background layer image to identify input fields, match the identified fields with metadata in the foreground layer, and modify the mappings of the input fields defined within the foreground layer of a page description language document.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 illustrates layers 102, 112 of a multilayered document 122 according to an example embodiment. The layers include a background layer 102 and a foreground layer 112. The background layer 102 may be an image file, other data defining an image, textual data, or a combination of these. Further reference herein to an image of the background layer 102 is intended to encompass all of these data types, and other as may be suitable based on a particular implementation, unless explicitly stated otherwise. The foreground layer 112 includes data, such as metadata, defining form fields that when processed within a suitable computer program, such as one of the programs within the ADOBE ACROBAT® program family, provide interactive mechanisms through which a user may input or retrieve data or perform other functions depending on the nature of the form and the particular embodiment.

For example, multilayered document 122 may include an interactive input field 124. The interactive input field 124 is defined as an input field 114 within the metadata of the foreground layer 112. The input field definition 114 may include a name and a mapping within the bounds of the background layer 102 of where the interactive input field 124 is located. Such a mapping may include a page number reference, an X and Y coordinate of a starting location on the referenced page, and a width and height of the field form the X/Y coordinate. For example, the input field definition 114 may map to the rectangular area 104 of the background layer 102 image. The input field definition 114 may also include a field type and other data defining how and where the interactive input field 124 is to be displayed.

Figure 2:
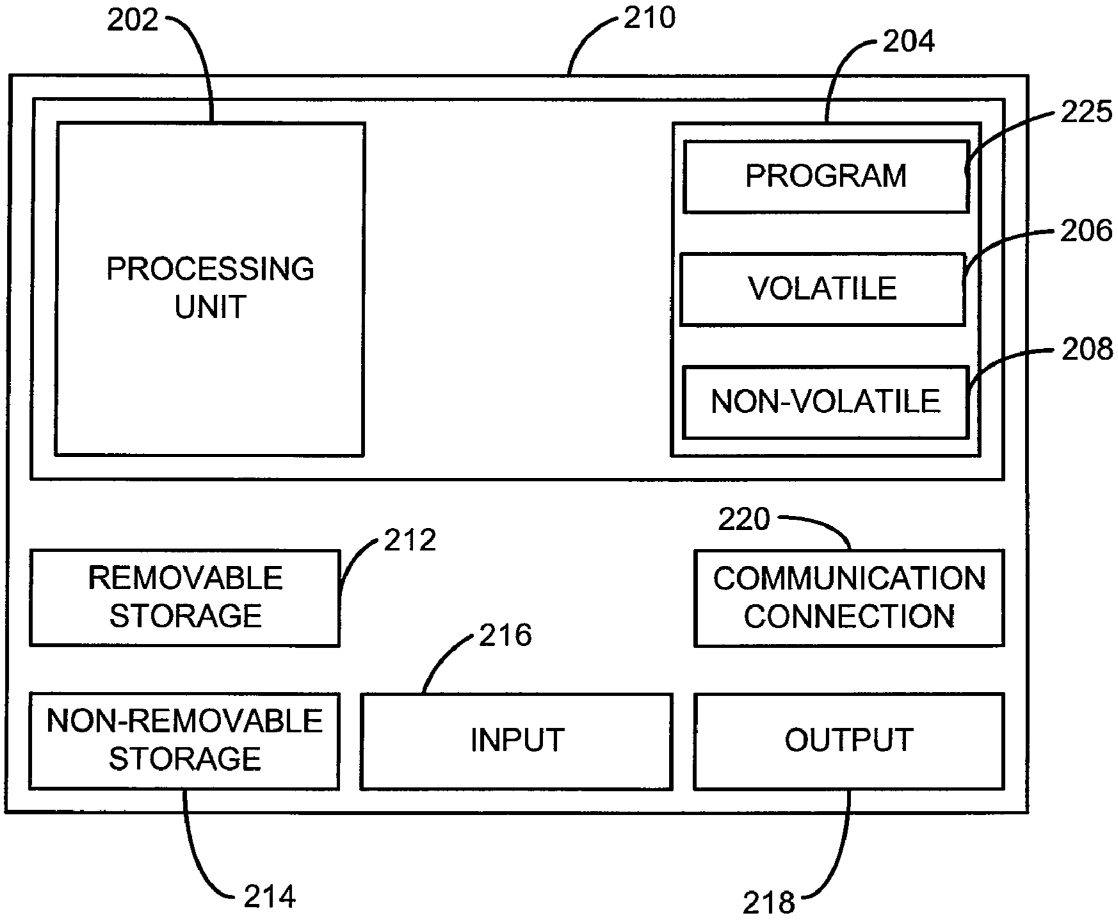
FIG. 2 is a block diagram of a computing device according to an example embodiment.

FIG. 2 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a computer-readable medium. For example, a computer program 225, such as one of the programs within the ADOBE ACROBAT® program family, may be installed on the computer stored within the memory 204 or elsewhere, such as the non-removable storage or accessed, in whole or in part, over the communication connection 220.

Figure 3:
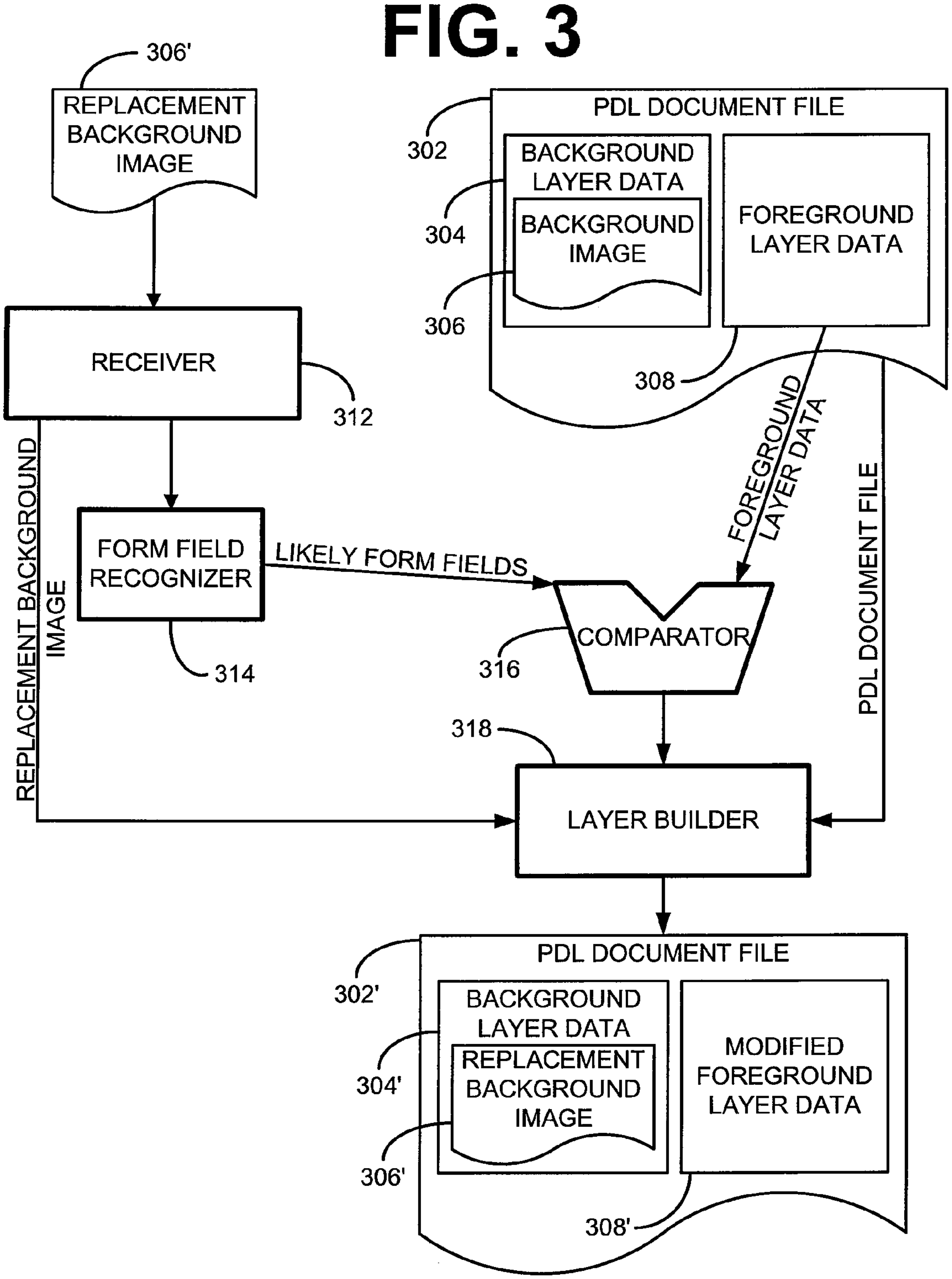
FIG. 3 is a block and flow diagram of data flowing through a system according to an example embodiment.

FIG. 3 is a block and flow diagram of data flowing through a system according to an example embodiment. The data of FIG. 3 includes a page description language document file 302 ("PDL file 302") that includes background layer data 304 which includes a background image 306. The PDL file 302 also includes foreground layer data 308. The data also includes a replacement background image 306' that flows though process elements along with the PDL file 302 to produce a modified PDL file 302'.

The replacement background image 306' flows into a receiver processing element 312. The receiver processing element 312 is operable to receive a replacement background image 306' to embed in the modified PDL file 302' background layer data 304' in place of the previous background image 306 in the PDL file 302 background layer data 304. The replacement background image 306' then flows to a form field recognizer processing element 314.

The form field recognizer processing element 314 is operable to recognize likely form fields in images, such as the replacement background image 306' received by the receiver processing element 312.

In some embodiments, the form field recognizer processing element 314 is operable to recognize likely form fields in images through performance of one or more edge detecting techniques to identify likely input field shapes and locations thereof. For example, raster-based edge detection techniques, vector-based edge detection techniques, text detection and extraction techniques, and/or image detection techniques, or combinations thereof, can be used to detect graphical elements in the replacement background image 306'. Examples of raster-based edge detection techniques can be found in U.S. Pat. No. 6,639,593, entitled "CONVERTING BITMAP OBJECTS TO POLYGONS" to Stephan Yhann, issued Oct. 28, 2003, assigned to the assignee of the present application, the disclosure of which is incorporated by reference herein. Examples of vector-based edge detection techniques can be found in U.S. Pat. No. 6,031,544, entitled "VECTOR MAP PLANARIZATION AND TRAPPING" to Stephan Yhann, issued Feb. 29, 2000, assigned to the assignee of the present application, the disclosure of which is incorporated by reference herein. Thus, for example, if the graphical elements of the replacement background image 306' are described in raster form, a conventional raster-based edge detection technique implementing the Hough transform can be used to identify one or more lines in an electronic document, such as line outlining the rectangular area 104 of the background layer 102 image in FIG. 1. If the graphical elements of the replacement background image 306' are described in vector form, a conventional vector-based edge detection technique can be used to identify edges implicitly within the vector display list (i.e., wherever a line is drawn, at least one edge exists and wherever a rectangle is drawn, four edges exist). If the graphical elements are described in hybrid form, then a raster-based edge detection technique can be used in combination with a vector-based edge detection technique to identify lines or edges in an electronic document.

In some instances, in the replacement background image 306' the graphical elements can be skewed, which can interfere with some detection techniques. For example, if a paper version of a document is misaligned during scanning, the entire electronic version of the paper document will be skewed. In such cases, the skewing can be corrected using conventional de-skewing techniques such as those described in U.S. Pat. No. 6,859,911, entitled "GRAPHICALLY REPRESENTING DATA VALUES" to Andrei Herasimchuk, issued Feb. 22, 2005, assigned to the assignee of the present application, the disclosure of which is incorporated herein by reference.

In some embodiments, at each identified location within the replacement background image 306', the form field recognizer processing element 314 defines an area for the input field based on the identified graphical elements. Generally, the area of an input field can be defined such that the input field does not overlap (or cover) other graphical elements in the image. Alternatively, the area of the input field can be defined such that the input field will overlap other elements, such as text, in the image. For example, an input field can be defined as a rectangle (e.g., using edge detection techniques to detect lines in the image) that includes a text label in, e.g., the upper left corner, that describes or names the field. In one implementation, the system can be configured to detect only certain types of graphical elements (e.g., lines), while disregarding other types (e.g., text).

The recognized likely form fields are then forwarded to a comparator processing element 316 which also receives or retrieves the foreground layer data 308 of the PDL file 302. The comparator processing element 316 is operable to compare and match likely form fields recognized by the form field recognizer processing element 314 to form fields defined in foreground layer data 308 of the PDL file 302. In some embodiments, the comparator processing element 316 compares metadata defining input fields within the foreground layer data 308 to data identified within the replacement background image 306' by the form field recognizer processing element 314. Such comparison may be made on field names, locations of likely form fields in relation to other likely form field locations in view of form fields positioned closely together in the foreground layer data 308. Other comparisons are possible. In some embodiments, rules may be configured for the comparator processing element 316 to use. In these, and other embodiments, the comparator processing element 316 may also use a score technique to assign a score to potential matches and to declare a match if the score reaches a certain threshold. The threshold may be defined as a configuration setting in some embodiments.

In some embodiments, data representative of form field matches between the likely form fields of the replacement background image 306' and the foreground layer data 308 is then forwarded to a layer builder processing element 318. The layer builder processing element 318 may also receive and/or retrieve the replacement background image 306 and the PDL file 302. The layer builder processing element 318 is operable against each likely form field matched by the comparator processing element 316 with a form field defined in the foreground layer data 308 of the PDL file 302 to modify a mapping element of each matched form field definition to a location within the replacement background image 306' where the recognized likely form field is located. The layer builder processing element 318 outputs a modified PDL file 302' including the replacement background image 306' embedded within, or referenced by, the background layer data 304'. The PDL file 302' also include the modified foreground layer data 308'.

In some embodiments, a system including the processing elements of FIG. 3 may also include a user interface module operable to cause one or more user interfaces to display data and receive input. An example embodiment of such a user interface generated by a user interface module is illustrated in FIG. 4.

Figure 4:
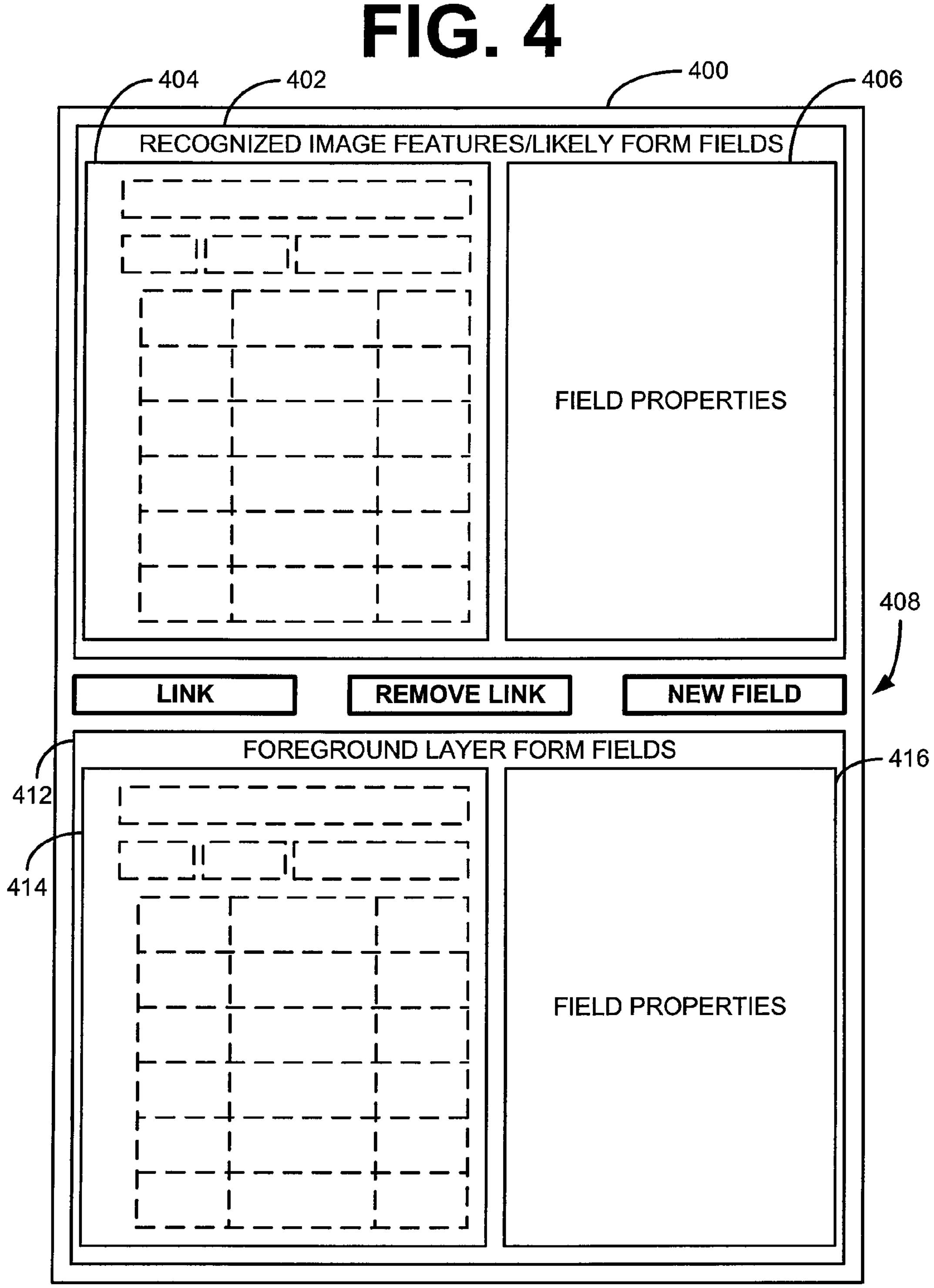
FIG. 4 is a user interface diagram according to an example embodiment.

FIG. 4 is a user interface diagram 400 according to an example embodiment. The user interface diagram 400 includes a recognized image features/likely form fields portion 402, a foreground layer form fields portion 412, and a set of action buttons 408. Although action buttons 408 are illustrated, other embodiments may include other user interface controls as deemed appropriate for the particular embodiment. The recognized image features/likely form fields portion 402 provides a view 404 of a modified background image including an identification of the likely form fields. This view 404 may also include a display of likely form field properties 406 that may list all likely form field properties or the properties of a selected likely form field. The foreground layer form fields portion 412 includes a view 414 that providing a representation of form fields defined in the foreground layer data of the PDL file. This view 414 may also include a display of form field properties 416 that may list all form field properties or the properties of a selected form field.

In some embodiments, a likely form field may be selected in the view 404 of the modified background image and a form field may be selected in the view 414 of form fields defined in the foreground layer data. If the selections in both views 404, 414 are linked, the "REMOVE LINK" action button may be selected to remove a mapping between the two. Conversely, if a selection is made in each view 404, 414, the "LINK" action button may be selected to establish a link between them. The "REMOVE LINK" and "LINK" action buttons, when selected, cause the foreground layer data to be modified accordingly. The set of action buttons 408 of the user interface diagram 400 also include a "NEW FIELD" action button which may be selected to define a new form field in the view 404 of the modified background image. Selection of the "NEW FIELD" button allows a user to select, or otherwise define, a portion of the modified background image and define or modify properties of the new field in the likely form field properties portion 406.

Returning to FIG. 3, following modification of the foreground layer data 308 though a user interface, such as is illustrated in FIG. 4, the layer builder processing element 318 is operable to assemble the modified PDL file 302'.

Figure 5:
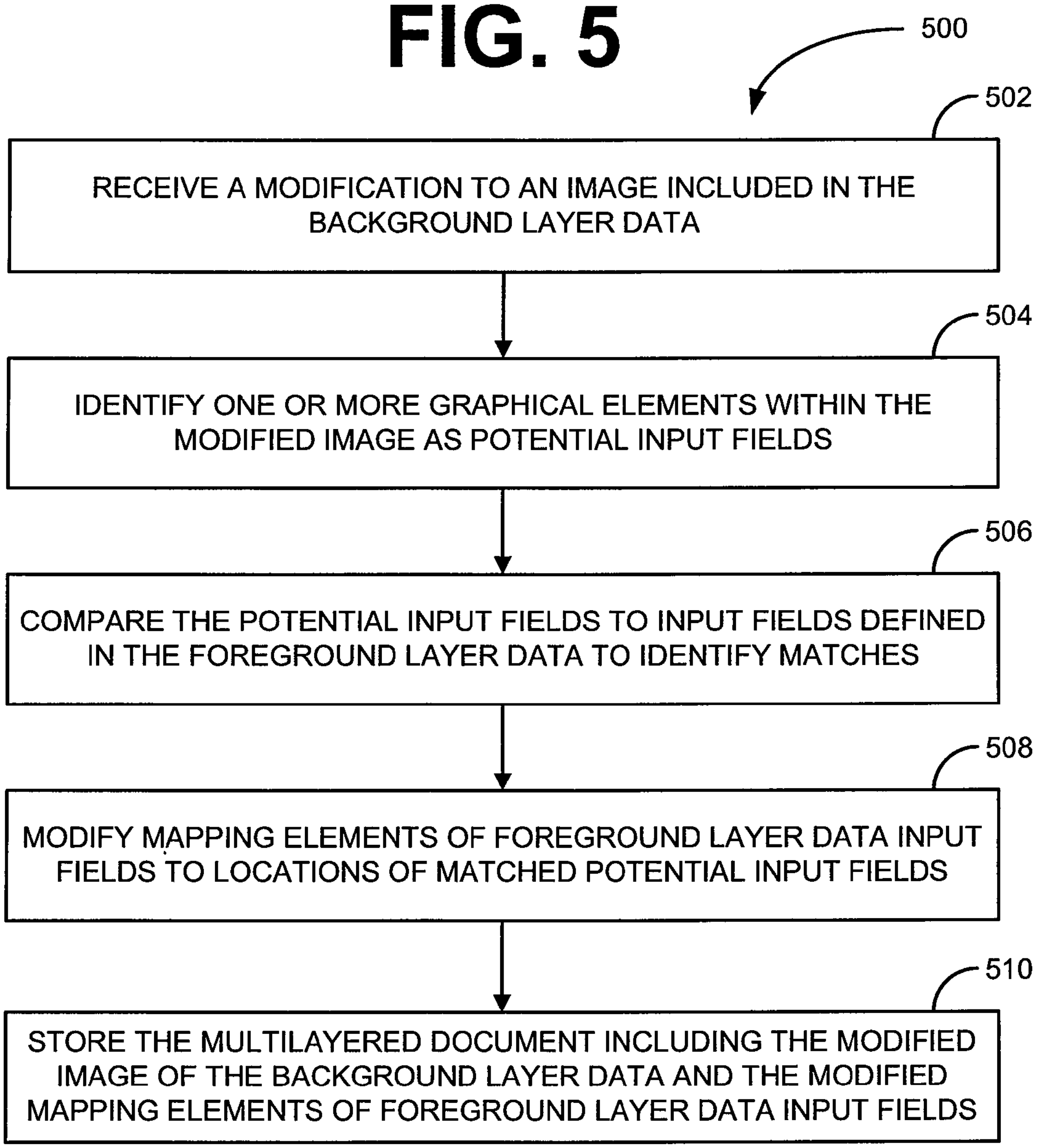
FIG. 5 is a block flow diagram of a method according to an example embodiment.

FIG. 5 is a block flow diagram of a method 500 according to an example embodiment. The method 500 is performed by a computing device, such as a computer, to process a multilayered, electronic document file including background layer data and foreground layer data. The method 500 in example embodiments includes receiving 502 a modification to an image included in the background layer data and identifying 504 one or more graphical elements within the modified image as potential input fields. The method 500 further includes comparing 506 the potential input fields to input fields defined in the foreground layer data to identify matches and modifying 508 mapping elements of foreground layer data input fields to locations of matched potential input fields. The method 500 may then store 510 the multilayered document including the modified image of the background layer data and the modified mapping elements of foreground layer data input fields. In other embodiments, the modified multilayered document may be sent over a computer network to another computing device that submitted the modified image, other data including the foreground layer data, and a request that the method 500 be performed.

In some embodiments, receiving 502 the modification to the image included in the background layer data includes replacing an existing image in the background layer data with a newly received image.

In some embodiments, input fields defined in the foreground layer data include metadata defining properties of each input field. The metadata may include metadata defining a location in the foreground layer corresponding to a location in the image of the background layer data upon which the input field is to be displayed and metadata naming of each input field defined in the foreground layer data.

Identifying 504 the one or more graphical elements within the modified image as potential input fields may include naming each of the one or more identified potential input fields as a function of text in the modified image located in relation to each respective potential input field. Such text may include text located within a boundary of an identified potential input field.

The comparing 506 of the potential input fields to the input fields defined in the foreground layer data to identify matches may, in some embodiments, include comparing a name of a potential input field to names of input fields in the foreground layer data to identify a likely match. A match may be a match of a portion of the name or an exact match depending on the particular embodiment or configuration thereof. In some such embodiments, and some others, comparing 506 the potential input fields to the input fields defined in the foreground layer data to identify matches includes matching locations of potential input fields identified within the modified image to locations defined in the mapping elements of foreground layer data input fields. Other methods and techniques may be used to identify matches, or at least likely matches. Some such methods and techniques may utilize multifactor matching techniques along with scoring and threshold scores for identifying matches. Various properties of input fields may be compared and a score assigned to each matched property. In some embodiments, if certain properties match, a match may be automatically declared. However, the matching techniques and methods may be selected and adapted based on the specifics of a particular embodiment.

Figure 6:
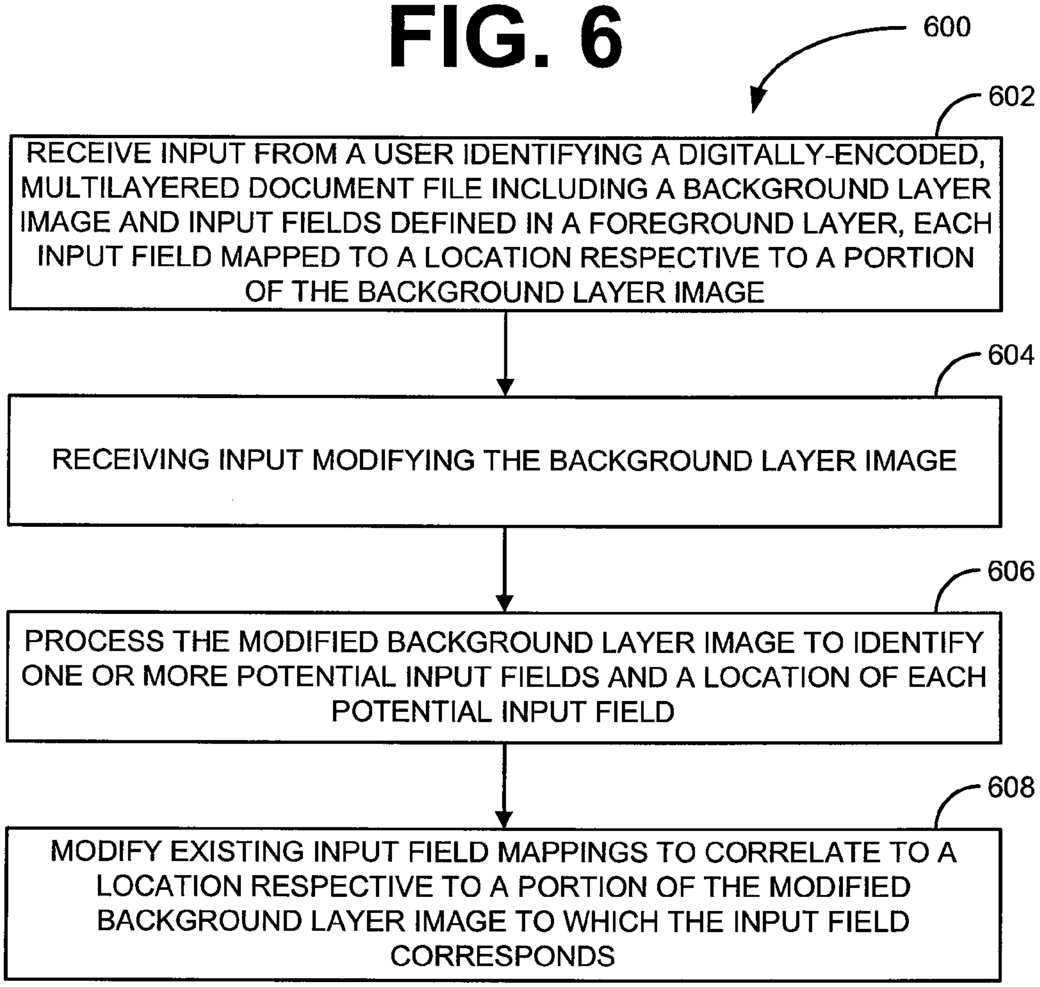
FIG. 6 is a block flow diagram of a method according to an example embodiment.

FIG. 6 is a block flow diagram of a method 600 according to an example embodiment. The method 600 in the example embodiment includes receiving 602 input from a user identifying a multilayered document file. The digitally-encoded, multilayered document file may include a background layer image and input fields defined in a foreground layer and each input field may be mapped to a location respective to a portion of the background layer image. The method 500 further includes receiving 604 input modifying the background layer image and processing 606 the modified background layer image to identify one or more potential input fields and a location of each potential input field. The method also includes modifying 608 existing input field mappings to correlate to a location respective to a portion of the modified background layer image to which the input field corresponds.

In some embodiments, processing 606 the modified background layer image to identify the one or more potential input fields and the location of each potential input field includes performing one or more edge detecting techniques, as described above, against the modified background layer image to identify likely input field shapes and locations thereof.

Some embodiments of the method 600 also provide a user interface including a view of the modified image including an identification of the identified potential input fields and also a representation of input fields defined in the foreground layer of the digitally-encoded, multilayered document file. Such a user interface may be operable to receive input linking an input field defined in the foreground layer to a potential input field of the modified image. An example of such a user interface is illustrated and described with regard to FIG. 4. In some embodiments, such user interfaces may also be operable to provide a graphical representation of a suggested linking between an input field defined in the foreground layer of the digitally-encoded, multilayered document file and a potential input field of the modified image.

In some embodiments, the digitally-encoded, multilayered document file is a file encoded according to a page description language file format specification. The page description file format specification, in some such embodiments, is a version of the ADOBE Portable Document File format specification.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:

receiving a modification to an image included in background layer data of a multilayered, electronic document file including the background layer data and foreground layer data;

identifying one or more graphical elements within the modified image as one or more first input fields, the identifying including:

naming each of the one or more first input fields as a function of text in the modified image located in relation to each respective first input field;

comparing the first input fields to one or more second input fields defined in metadata of the foreground layer data to identify matching first input fields, the metadata defining the one or more second input fields including:

first metadata defining a location in the foreground layer corresponding to a location in the image of the background layer data upon which the second input field is to be displayed;

second metadata naming each second input field defined in the foreground layer data; and wherein the comparing includes comparing a name of a first input field to names of input fields in the foreground layer data to identify a likely match, a likely match is defined within a configuration setting;

modifying mapping elements of the second input fields defined in the foreground layer data to locations of the matched first input fields.

2. The computerized method of claim 1, further comprising:

storing the multilayered document including the modified image of the background layer data and the modified mapping elements of the second input fields in the foreground layer data.

3. The computerized method of claim 1, wherein the receiving of the modification to the image included in the background layer data includes:

replacing an existing image in the background layer data with a newly received image.

4. The computerized method of claim 1, wherein the identifying of the one or more graphical elements within the modified image as the first input fields includes:

performing one or more edge detecting techniques to identify likely input field shapes and locations thereof.

5. The computerized method of claim 1, wherein text in the image located in relation to a first input field includes text located within a boundary of an identified first input field.

6. The computerized method of claim 1, wherein a likely match defined in a configuration setting between a first input field name and an input field name in the foreground layer data defines an exact match.

7. The computerized method of claim 1, wherein the comparing of the first input fields to the input fields defined in the foreground layer data to identify matches includes:

matching locations of first input fields identified within the modified image to locations defined in the mapping elements of foreground layer data input fields.

8. A computer program product tangibly embodied on a computer-readable medium, comprising instructions operable to:

receive input identifying a multilayered document file including a background layer image and input fields defined in a foreground layer, each input field mapped to a location in the background layer image;

receive input modifying the background layer image and generate a modified background layer image based on the input;

process the modified background layer image to identify one or more potential input fields and a location of each potential input field;

modify existing input field mappings to correlate to locations in the modified background layer image to which respective input fields correspond;

provide a representation including a view of the modified image including an identification of the potential input fields;

provide a representation of input fields defined in the foreground layer of the multilayered document file; and receive input linking an input field defined in the foreground layer to a potential input field of the modified image.

9. The computer program product of claim 8, wherein the processing of the modified background layer image to identify the one or more potential input fields and the location of each potential input field includes:

performing one or more edge detecting techniques against the modified background layer image to identify input field shapes and locations thereof.

10. The computer program product of claim 8, comprising further instructions to:

provide a suggested linking between a first input field defined in the foreground layer of the multilayered document file and a second input field of the modified image.

11. The computer program product of claim 10, wherein a suggested linking is identified by:

performing edge detection against the modified background layer image to identify input field shapes and locations thereof; and comparing an identified location of an input field with locations of input fields defined in the foreground layer to identify a match within a defined matching threshold.

12. The computer program product of claim 10, wherein the suggested linking is identified by:

performing edge detection against the modified background layer image to identify input field shapes and locations thereof;

naming each input field as a function of text extracted from the modified background layer image located in relation to respective identified likely input fields; and comparing input field names to names of input fields defined in the foreground layer.

13. The computer program product of claim 8, wherein the multilayered document file is a file encoded according to a page description language file format specification.

14. A system comprising:

a receiver operable to receive an image to embed in a page description language file background layer as a replacement for a previous image of the page description language file background layer;

a form field recognizer operable to recognize a first form field in the image received by the receiver;

a comparator operable to compare and match the first form field recognized by the form field recognizer to a second form field defined in a foreground layer of a page description language file;

a layer builder operable against the second form field to modify a mapping element of the second form field to a location within the received image where the first form field is located;

a user interface module operable to cause one or more user interfaces to display data and receive input, the one or more user interfaces including:

a view of the received image including an identification of the first form field;

a view including a representation of the second form field defined in the foreground layer of the page description language file; and one or more user interface controls operable to receive input linking the second form field defined in the foreground layer to the first form field of the modified image, wherein the layer builder is further operable against the first form field linked though the input received via one or more user interfaces of the user interface module with the second form field defined in the foreground layer of the page description file to modify the mapping element of the second form field to the location within the received image where the first form field is located.

15. The system of claim 14, wherein the form field recognizer is operable to recognize the first form field through performance of one or more edge detecting techniques to identify input field shapes and locations thereof.

* * * * *